United States Patent Office 3,532,643
Patented Oct. 6, 1970

3,532,643
POLYXYLYLIDENES AND METHOD
OF PREPARATION
Ritchie A. Wessling, Midland, and Ray G. Zimmerman, Shepherd, Mich., assignors to The Dow Chemical Company, Midland, Mich., a corporation of Delaware
No Drawing. Filed Feb. 23, 1967, Ser. No. 617,832
The portion of the term of the patent subsequent to Sept. 10, 1985, has been disclaimed
Int. Cl. C08f 47/00; C08g 33/00
U.S. Cl. 260—2
3 Claims

ABSTRACT OF THE DISCLOSURE

The compositions are of the class of polyxylylidenes having a high degree of polymerization and useful as coatings and films. They are made by converting water-soluble polyelectrolytes derived from sulfonium salts.

This invention relates to polyxylylidenes. Specifically, this invention relates to novel polyxylylidenes having a high degree of polymerization and to the novel method of preparing them. More specifically, this invention relates to polyxylylidenes having recurring units of the structure

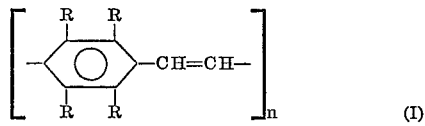

(I)

wherein R represents hydrogen or the methyl group, and $n$ represents a number of about 500 or higher, i.e., the number average degree of polymerization or the point where the mechanical properties of the polymer asymptotically approach a maximum value. See, for example, L. E. Nielsen, Mechanical Properties of Polymers, Reinhold Pub. Corp., New York (1962), pp. 115–117.

The compositions of the invention are intensely colored, usually ranging from yellow-orange to deep red to brown, and show strong absorption of ultraviolet light as well as being fluorescent when exposed to ultraviolet light. The mechanical properties of polymers of the invention are those characteristic of hard, brittle, infusible solids. The polymers are useful for a variety of purposes and can be obtained in a variety of forms such as coatings, as binders in composites, films, and fine powders. The conjugated aromatic character of these polymers imparts good thermal stability and solvent resistance to the final product.

Polyxylylidenes are known in the art. See for example those described in U.S. Pat. 3,110,687. However, they are generally characterized by a low degree of polymerization such as from 2 to 100. The polymers obtained heretofore are infusible, yellow or darker, fluorescent powders of limited utility and generally poor mechanical properties. In addition, these polymers usually contain halogen atoms such as chlorine or bromine which impart thermal instability.

It is a primary object of this invention to provide polyxylylidenes which are useful in the preparation of coatings, films, foams, resins as well as fine powders, thereby making them useful in a wide variety of applications. It is a further object to provide polyxylylidenes having a degree of polymerization of about 500 or higher and having good mechanical properties. It is another object to provide polyxylylidenes having a high degree of polymerization and free from halogen atoms. It is still another object to provide a method for preparing the above polymers.

In accordance with this invention it has now been discovered that polyxylylidenes having recurring units and properties of the type described above can be prepared by converting water-soluble polyelectrolytes such as those described in copending application, Ser. No. 591,706, filed Nov. 3, 1966, now U.S. Pat. 3,401,152. These polyelectrolytes are derived from monomeric sulfonium salts and have recurring units of the structure

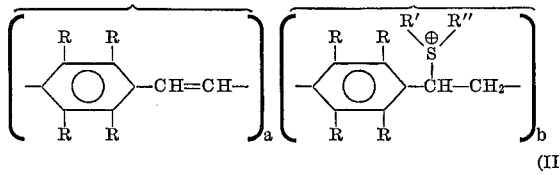

(II)

wherein R is hydrogen or the methyl group, R' and R" each represents an alkyl group containing from 1 to 4 carbon atoms, and A is a counter-ion which can be derived from any low molecular weight acid so long as it does not precipitate polymer or react with polymer in aqueous solution. Suitable low molecular weight acids from which the counter-ion A can be derived include both inorganic acids such as hydrohalic acids, which provide a halide ion, e.g., chloride or bromide ion, and carbonic acid which provides a bicarbonate ion, and organic acids such as acetic, propionic, butyric, maleic, citric, or oxalic acid. The ratio of the units comprising the polyelectrolyte structure in a random grouping is represented by the integers $a$ and $b$ in which the ratio $a:b$ ranges from about 1:10 to about 3:1 or to the ratio corresponding to the point of incipient water insolubility. The polyelectrolytes useful in the practice of the invention can either be isolated or directly reacted from the solution in which they were prepared.

The conversion step in the above procedure can be carried out by any process which will cause the sulfonium side group to eliminate leaving a double bond, i.e.,

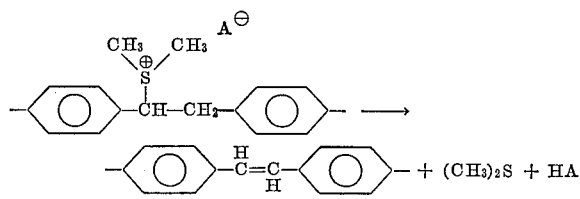

Normally, this process is carried out by drying the polyelectrolyte and heating if necessary to induce decomposition. The decomposition can be carried out at temperatures between about 0° and 300° C. depending on the choice of counter-ion or anion. For example, anions such as the hydroxide ion permit conversion at low temperatures; anions such as the chloride ion can be converted at intermediate temperatures; and anions such as the maleate ion can be converted at maximum temperatures.

The color and thermal stability of poly-p-xylylidene depend on several factors. The most important are: conjugated sequence length; and cis/trans double bond ratio. The first is primarily a function of degree of polymerization but is also influenced by the presence of saturated groups caused by side reactions during polymerization or subsequent cross-linking reactions. The cis/trans ratio depends on the temperature at which the unsaturated polymer is formed. Low temperature cures favor both trans double bond formation and long conjugated sequence formation. Therefore, polyxylylidenes are best prepared at the lowest temperatures feasible. This is best accomplished by reaction of the polyelectrolyte in the hydroxide form.

The following nonlimiting examples serve to illustrate the invention.

EXAMPLE I (A) Decomposition of polyelectrolyte derived from p-phenylene dimethylene bis (diethyl sulfonium chloride) to give poly-p-xylylidene.

Higher molecular weight polymers are formed by polymerizing diethyl sulfonium salts. Due to high reactivity these salts cannot be ion exchanged easily without gelling on the resin. A preferred approach for making high molecular weight polyxylylidene is to make the diethyl sulfonium polyelectrolyte first, isolate it, then convert it to the hydroxide form by ion exchange. This procedure yields an unstable orange solution which can be cast to give a red-orange coating of poly-p-xylylidene.

500 ml. of 2.0 N p-phenylene dimethylene bis (diethyl sulfonium chloride) was cooled to 0° C. and purged with nitrogen. Added thereto with rapid stirring was 500 ml. of 2.0 N sodium hydroxide which was prechilled to 0° C. and also purged with nitrogen. The materials gelled up almost immediately on contact with each other. The reaction mixture turned orange-brown upon starting of the reaction and was reacted for 15 minutes with the color turning a greenish yellow. After 15 minutes, 500 ml. of 1 N HCl was added to the reaction mixture to quench it. The material being highly viscous was cut into pieces with a pair of scissors and placed in a Waring blender. Approximately 2200 ml. of water was added thereto and blended until a pourable liquid resulted. The pH of the mixture was 6.

The material was dialyzed against deionized water, then run through a Waring blender to disperse a few gel pieces. The total volume of material after dialysis was 6900 ml. This polyelectrolyte material had a normality of 0.03. The percent solids of the material was determined by taking 50.0006 grams thereof and drying in an air oven at 70° C. for 25 hours then at 140° C. for 4 hours. The sample after it was dried contained 0.3971 percent solids.

The polyelectrolyte thus prepared consisted mainly of the following structural unit

wherein $n$, the number average degree of polymerization, was observed to be approximately 2800. The yield of the high molecular weight polyelectrolyte was calculated to be 41 percent (207 meq.).

(B) 900 ml. of water was added to 100 ml. of the 0.03 N polyelectrolyte material prepared above. Added thereto in bead form was 50 ml. of a quaternary ammonium strong base anion exchange resin in the basic or hydroxide form, e.g., a resinous cross-linked polymeric vinylbenzyl trimethyl ammonium hydroxide. Such ion exchange resins are well known in the art as disclosed in U.S. Pats. 2,591,573 and 2,614,099. The resulting mixture thickened and began to turn green. The ion exchange beads were filtered off, and the solution evaporated to dryness at 70° C. The product was a bright orange, brittle, transparent film of poly-p-xylylidene. The product was identified by infrared spectra and had a number average degree of polymerization of about 2800.

EXAMPLE II 250 ml. of the polyelectrolyte prepared in Example I (A) was mixed with 750 ml. of methyl alcohol, then the viscous solution was passed through an ion exchange column containing a strong base anion exchange resin similar to the type employed in Example I. Polymer was eluted from the column with a 3:1 mixture of methyl alcohol and water. The initial hydroxide-containing polymer to come off the column was a yellow, viscous solution and, as elution continued, the viscosity dropped off and the solution became orange in color and showed yellow fluorescence under ultraviolet excitation. Substantially all of the polyelectrolyte in the hydroxide form was taken off the column in three cuts (approximately 100 percent conversion), the first cut was 1200 ml., and the next two were 1000 ml. each. From the first cut a film was cast and dried first in air at 65° C., then under vacuum at 180° C. A hard, orange, translucent film of poly-p-xylylidene having a number average degree of polymerization of about 2800 was obtained. The product was identified by infrared spectra. The X-ray analysis showed the film contained less than 0.1 percent chlorine. The yield of poly-p-xylylidene from the first cut was 0.6 gram; from the second and third cuts taken together the yield was also 0.6 gram.

Following the same procedure as above except for varying the concentrations of reactants used to prepare the polyelectrolyte, poly-p-xylylidene products having degrees of polymerization ranging from about 700 to about 4500 were prepared.

Decomposition of the polyelectrolyte by any suitable treatment which will eliminate the sulfonium side group, such as by thermal treatment, will generate polyxylylidene. In converting to polyxylylidene the chemical reaction involves only substituents on the polymer chain, and does not involve a change in the degree of polymerization.

EXAMPLE III 19.5 grams of 2,5-dimethyl-p-phenylene dimethylene bis (diethyl sulfonium chloride) was dissolved in 250 ml. of deionized water. After cooling to 5° C. and flushing with nitrogen, 50 ml. of cold 1 N sodium hydroxide solution was added with rapid stirring. After 10 minutes, the mixture containing an intermediate polyelectrolyte similar to that described in copending application, Ser. No. 591,706, filed Nov. 3, 1966, was diluted to 4000 ml. with ice water. The mixture was dialyzed against deionized water to isolate the polyelectrolyte obtained from the salt by-product.

Following a procedure similar to that employed in Example I(B), a poly-2,5-dimethyl-p-xylylidene product is obtained having a degree of polymerization of about 6000.

We claim:

1. A polyxylylidene composition containing recurring units of the structure

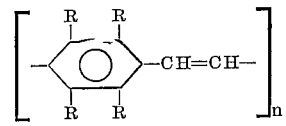

wherein R represents hydrogen or the methyl group, and $n$ represents a number average degree of polymerization of from about 500 to 6000.

2. A method for preparing polyxylyidene compositions which comprises converting by drying at a temperature between about 0° and about 300° C. an aqueous solution of polyelectrolyte derived from monomeric sulfonium salts and having recurring units of the structure

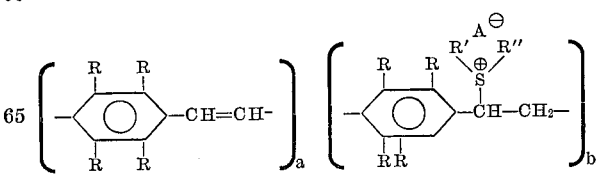

wherein R represents hydrogen or the methyl group, R′ and R″ each represents an alkyl group containing from 1 to 4 carbon atoms, A represents a counter-ion, and $a$ and $b$ are integers which show the ratio of the respective recurring units in the structure, the ratio of $a$ to $b$ ranging from about 1 to 10 to about 3 to 1 or to the ratio corresponding to the point of incipient water insolubility.

3. The method of claim 2 wherein R is hydrogen, R' and R" each represent a methyl or ethyl group, and A is a hydroxide ion or bicarbonate ion.

References Cited

UNITED STATES PATENTS

| | | |
|---|---|---|
| 2,763,630 | 9/1956 | Hubbard. |
| 2,902,522 | 9/1959 | Owen. |
| 3,110,687 | 11/1963 | Smith. |
| 3,238,276 | 3/1966 | La Combe _____ 260—79.7 |
| 3,401,152 | 9/1968 | Wessling et al. |
| 3,274,127 | 9/1966 | Szwarc. |
| 3,405,117 | 10/1968 | Yeh. |
| 3,413,241 | 11/1968 | Le Suer et al. |
| 3,427,261 | 2/1969 | Meyer. |

OTHER REFERENCES

Houben-Weyl: Methoden der Organischen Chemie, 1955, p. 191.

Dunnavant et al.: "Xylylidene-Chloroxylylene Copolymers," Journal of Polymer Science: Part A, vol. 3, No. 10, 1965, pp. 3649–3653.

JAMES A. SEIDLECK, Primary Examiner

U.S. Cl. X.R.

260—2.5, 78.4, 79.7, 93.5